US009727923B2

(12) United States Patent
Teh et al.

(10) Patent No.: US 9,727,923 B2
(45) Date of Patent: Aug. 8, 2017

(54) TIME ATTENDANCE TRACKING METHOD AND SYSTEM

(71) Applicants: Hon Seng Teh, Puchong (MY); Kah Heng Chong, Puchong (MY); Khang Yu Chok, Puchong (MY)

(72) Inventors: Hon Seng Teh, Puchong (MY); Kah Heng Chong, Puchong (MY); Khang Yu Chok, Puchong (MY)

(73) Assignee: INFORSTANDARD SDN BHD, Puchong (MY)

( * ) Notice: Subject to any disclaimer, the term of this patent is extended or adjusted under 35 U.S.C. 154(b) by 0 days.

(21) Appl. No.: 14/987,285

(22) Filed: Jan. 4, 2016

(65) Prior Publication Data

US 2016/0132971 A1  May 12, 2016

Related U.S. Application Data

(63) Continuation-in-part of application No. 13/944,269, filed on Jul. 17, 2013.

(30) Foreign Application Priority Data

Jul. 23, 2012 (MY) ............................ PI2012700490

(51) Int. Cl.
*G06F 15/02* (2006.01)
*G06Q 40/00* (2012.01)
*H04W 12/06* (2009.01)
*G06Q 10/10* (2012.01)
*H04L 29/06* (2006.01)
*H04W 12/08* (2009.01)

(52) U.S. Cl.
CPC ....... *G06Q 40/125* (2013.12); *G06Q 10/1091* (2013.01); *H04W 12/06* (2013.01); *H04L 63/0861* (2013.01); *H04W 12/08* (2013.01)

(58) Field of Classification Search
CPC ..................................................... G06F 15/02
USPC ......................................................... 705/32
See application file for complete search history.

(56) References Cited

U.S. PATENT DOCUMENTS

2005/0109836 A1* 5/2005 Ben-Aissa ......... G06K 9/00087
235/380
2005/0251435 A1* 11/2005 Paolella ................. G06Q 10/00
705/7.13
2008/0296364 A1* 12/2008 Pappas ................... G06Q 10/06
235/377

* cited by examiner

*Primary Examiner* — Andrew Joseph Rudy
(74) *Attorney, Agent, or Firm* — Preston Smirman; Smirman IP Law, PLLC

(57) ABSTRACT

A time attendance tracking method is provided by which a hand-held device is set as a primary device and/or a secondary device based on inherent mobile identity of the hand-held device and operable in either a first mode and/or a second mode. The first mode permits the user to clock-in and/or clock-out for attendance recording for the user tied account while the second mode restricts the user to clock-in and/or clock-out for attendance recording for the user tied account.

9 Claims, 7 Drawing Sheets

TIME ATTENDANCE TRACKING METHOD AND SYSTEM

CROSS-REFERENCE TO RELATED APPLICATION

The instant application is a continuation in part of U.S. patent application Ser. No. 13/944,269, filed Jul. 17, 2013, pending, and claims priority to Malaysian Patent Application Serial No. PI2012700490 filed Jul. 23, 2012, the entire specifications of both of which are expressly incorporated herein by reference.

FIELD OF INVENTION

The present invention relates to a time attendance tracking method and system. More particularly, the invention relates to a method and system of tracking time attendance using mobile computing platforms.

BACKGROUND OF THE INVENTION

Systems and methods are known in the art for tracking time attendance and location of employees. Commonly, employees are required to clock-in and clock-out when checking in and checking out of work respectively. Various devices can be found for time attendance tracking, frequently by the use of time clock installed within office and/or work premises using punch cards, identity card and even fingerprints. While time tracking is achievable for workers within their work premises, time attendance of workers outside work premises such as business trips and/or customer visiting are unable to be tracked. There also exists the possibility that time attendance devices at a job site are not functioning, damaged due to vandalism and/or even stolen. In such a case, it would be highly desirable for the supervisor, manager and/or foreman to be able to not only track his and/or her time, but also track the time of the employees at that job site.

Therefore, there is a need for a system to track time attendance and location of employees even out of work premises. Such system should also provides a way for employees not having such devices to record their attendances without having to go through a cumbersome request of authorized password method and can be done through a one-time registration method.

User profile is one of the important data in attendance system. Many systems require the system administrator to key in the user data manually and some systems allow the system administrator to import data from digital files to ease the data entry work. However, creating new user data and profile in a new system may be time consuming.

Leave application is another important process in attendance system Most of the companies rely on paperwork system, where employees must fill up and submit form to apply for leave. Managers and/or superiors must sign on the form to approve and/or deny the application.

Overtime working hours and pays affect operation costs in all industries. Management always keep an eye to overtime claim to ensure additional pays are worth when compared to the profit margin. Conventionally, companies still rely on paperwork to record and approve overtime claim, which requires lots of administration works and calculations. Although the electronic system can reduces the workload, managers and/or superiors must check all the claims before approvals. Furthermore, managers and/or superiors cannot pre-schedule overtime working time schedules for staff, nor to pre-approve all overtime claim within specific time durations. Under the usual circumstances, employees can only start work overtime after their manager and/or superior instructs them to do so but they may not receive the instruction and/or approval in time.

Therefore, there is a need exist for attendance system to provide an instant communication platform to allow interaction between the employees and their superior so as to ease the administrative workload.

Until now, time attendance tracking through wireless devices can be found by a number of patented technologies. Of interest is U.S. Pat. No. 8,126,788 which discloses a method for selectively tracking time attendance for either a single dedicated user and/or multiple non-dedicated users using a single multifunction electronic hand-held device. A time tracking software application is installed on the device to enable the dedicated user and non-dedicated users to clock-in and/or clock-out in a solo mode and in multiple users mode respectively. However, this prior art disclosed that the switching of the solo mode to the multiple users mode on the device and/or the other way around requires an authorized password, which could be troublesome.

U.S. Pat. No. 7,835,955 discloses a time attendance system that provides a device having a periodically changing code which is synchronized with a time clock associated with a service location. While the prior art discloses a system to track actual location and time of employees, it does not explore the importance of deterring buddy punching by limiting user of a computing device used for time attendance reporting. Moreover, the prior art focuses on tracking traveling time between a departure location and an arrival location by the computing device. Misuse of the computing device for buddy punching is therefore not explained which may be not a concern for this prior art.

SUMMARY OF INVENTION

Accordingly, it is a primary object of the present invention to provide a system and method that offer employees extreme flexibility of reporting time attendance anywhere and anytime. The present invention allows the employees to record their attendances and locations even when they are on business trips and/or visiting customers, which are located out of office premises, through network connections between a server and their hand-held devices.

It is another object of the present invention to track time attendance of employees by using employee's personal hand-held device for time attendance recording to avoid "buddy punching" and reporting of fake time attendances by a third party.

It is yet another object of the present invention to provide a time and location attendance tracking system and method that aim to help employees to become better motivated and more productive through observation of their working habits. The system provides detailed time attendances records where productivity of workforce can be monitored and corrections of work shifts can be applied.

It is still another object of the present invention to provide an attendance system that the employees and employer can interactively communicate with each other via the electronic platform for obtaining official approval from the employer. The system also allows the employees to edit and update their profile independently to the server.

To fulfill the aforementioned objectives, a time attendance tracking method comprising providing a server in communication with a database storing a plurality of registered primary and secondary mobile identity, which are hand-held device specific, that each secondary mobile identity is paired with a preset user name linked to a preset access code, wherein each user name is tied to an account; setting a hand-held device as a primary device and/or a secondary device based on inherent mobile identity of the hand-held device sent to the server, upon respectively matching the registered primary and/or registered secondary mobile identity in the database; allowing the user to use the primary device to operate in a mode that provides accessibility to its operations in full upon the user provided user name and access code matching with the preset user name and preset access code paired with the first mobile identity; allowing a single user to use the secondary device to operate in a mode that provides accessibility to partial of its operations upon the user provided user name and access code matching with the preset user name and preset access code paired with the second mobile identity; wherein the full mode permits the user to clock-in and/or clock-out for attendance recording, view the recorded attendance, export the recorded attendance of any user and/or any combination derived thereof for the tied account; and wherein the partial mode permits the user to view recorded attendance, export the recorded attendance of the corresponding user account and/or any combination derived thereof for the tied account.

A preferred embodiment of the present invention disclosed that the method further comprising the step of allowing the single user to use the primary and/or secondary device operated in the first mode to record clock-in and/or clock-out attendance in an offline condition.

In another embodiment of the present invention, the method further comprising the step of setting a hand-held device as a non-registered device based on inherent mobile identity of the hand-held device sent to the server, upon the provided mobile identity failed to match with any registered mobile identity.

In yet another embodiment of the present invention, the hand-held device further comprising a Global Positioning System for detecting location of the user at each clock-in and/or clock-out occasion and the detected location is tagged with the related clock-in and/or clock-out occasion.

In still another embodiment of the present invention, the access code and/or the preset access code is generated from alphabetic, numeric, alphanumeric, biometric data and/or a combination thereof. The biometric data can be selected from a group comprising face features, fingerprint, palm print and/or any two and/or more combinations thereof.

In yet another embodiment of the present invention, the hand-held device communicates with the server through an application installed onto the hand-held device.

In a further embodiment of the present invention, a time attendance tracking system comprising a server in communication with a database storing a plurality of registered primary and secondary mobile identity, which are hand-held device specific, that each secondary mobile identity is paired with a preset user identity linked to a preset access code, wherein each user identity is tied to an account; a hand-held device being set as a primary device and/or a secondary device based on inherent mobile identity of the hand-held device sent to the server; wherein the primary device is operable in a mode that provides accessibility to its operations in full upon user name and access code is provided and matching with the preset user name and preset access code paired with the first mobile identity; the secondary device is operable in a mode that provides accessibility to partial of its operations upon a single user provided user name and access code matching with the preset user name and preset access code paired with the second mobile identity; wherein the full mode permits the user to clock-in and/or clock-out for attendance recording, view the recorded attendance, export the recorded of any user and/or any combination derived thereof for the tied account; and wherein the partial mode permits the user to view recorded attendance, export the recorded attendance of the corresponding user account and/or any combination derived thereof for the tied account.

At least one of the preceding objects is met, in whole and/or in part, by the invention, in which the embodiment of the invention discloses a time attendance tracking system comprises a server in communication with a database storing a plurality of registered mobile identities and user accounts, the mobile identities are categorised into primary and secondary mobile identity, and each mobile identity is tied to at least one user account, and at least one registered mobile device in communication with the server, having a mobile identity and an application configured to provide a selection of first and second operation modes for a user to select one of the modes upon the activation of the application, provide a verification process for the user to log-in upon the selection of the mode, and provide different accessibilities of operations to the logged-in user depending on the selected mode and the mobile identity of the mobile device upon being successfully verified, whereby in the event of the mobile device having a primary mobile identity and the logged-in user account is an account tied to the primary mobile identity, the first mode of the application permits the logged-in user to perform attendance recording for any user account, and the second mode of the application permits the logged-in user to accept, reject, and/or modify a request sent by another user account and/or to transmit a request and/or modified request to the another user account, whereby in the event of the mobile device having a primary mobile identity and the logged-in user account is not an account tied to the primary mobile identity, the first mode of the application only permits the logged-in user to perform attendance recording for that particular account, and the second mode of the application permits the logged-in user to send a request to the at least one account tied to the primary mobile identity and/or accept a modified request, and whereby in the event of the mobile device having a secondary mobile identity, the application only allows the account tied to this secondary mobile identity to access the operations of the application, the first mode of the application only permits the logged-in user to perform attendance recording for the particular account, and the second mode of the application permits the logged-in user to send a request to the at least one account tied to the primary mobile identity and/or accept a modified request.

Preferably, the verification process includes the steps of reading information relating to the mobile identity of the mobile device, receiving information relating to the user identity and password, and communicating with the server to run a matching on the collected information with those in the database.

Preferably, the application further provides a third operation mode, whereby in the event of the mobile device having a primary mobile identity and the logged-in user account is an account tied to the primary mobile identity, the third mode permits the logged-in user to view and/or to export the recorded attendance of any user account; whereby in the event of the mobile device having a primary mobile identity and the logged-in user account is not an account tied to the primary mobile identity, the third mode only permits the logged-in user to view and/or export the recorded attendance of that particular account; and whereby in the event of the mobile device having a secondary mobile identity, the third mode only permits the logged-in user to view and/or to export the recorded attendance of that particular account.

Preferably, the application further provides a fourth operation mode that permits the logged-in user to edit and update the account information to the server.

Preferably, the application further provides an authentication process for the verification of the user. The authentication process includes fingerprint recognition, voice recognition, face recognition, hand geometric recognition, iris recognition, motion detection, and/or any combination thereof.

Preferably, the request generated by the second mode of the application includes content of a leave request, a overtime request, a outstation request, a meeting request, and/or any combination thereof.

Preferably, the transmission of the request generated by the second mode of the application will trigger the server to send a notification to a mobile device which the designated account is tied thereto.

Preferably, the mobile device is a personal digital assistant (PDA), a smart phone, a laptop, a netbook, a phablet, a phoblet, and/or any suitable electronic hand-held device with compatible operating system to support the application.

Preferably, the mobile identity of the mobile device is international mobile equipment identity (IMEI).

Preferably, the mobile device further includes a global positioning system (GPS) so that the application can acquire and record the location of the mobile device during the recording of the attendance.

One skilled in the art will readily appreciate that the invention is well adapted to carry out the objects and obtain the ends and advantages mentioned, as well as those inherent therein. The embodiments described herein are not intended as limitations on the scope of the invention.

BRIEF DESCRIPTION OF THE DRAWINGS

For the purpose of facilitating an understanding of the invention, there is illustrated in the accompanying drawing the preferred embodiments from an inspection of which when considered in connection with the following description, the invention, its construction and operation and many of its advantages would be readily understood and appreciated.

DETAILED DESCRIPTION OF THE INVENTION

Figure 1:
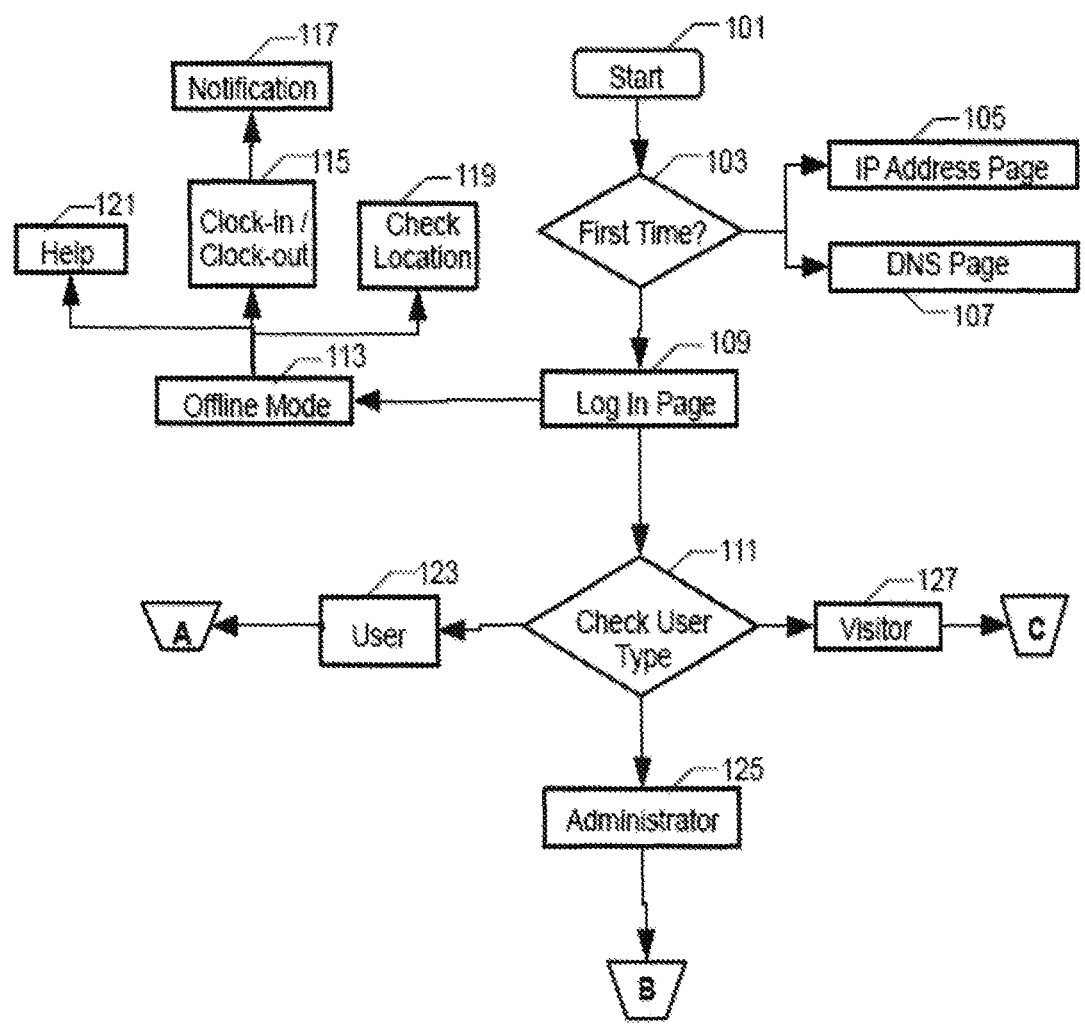
FIG. 1 shows a process flow depicting the steps taken in a preferred embodiment of the present invention.

The invention will now be described in greater detail, by way of example, with reference to the drawings.

The present invention provides a time attendance tracking method comprises the steps of providing a server in communication with a database storing a plurality of registered primary and secondary mobile identity, which are hand-held device specific, that each secondary mobile identity is paired with a preset user name linked to a preset access code, wherein each user name is tied to an account; setting a hand-held device as a primary device and/or a secondary device based on inherent mobile identity of the hand-held device sent to the server, upon respectively matching the registered primary and/or registered secondary mobile identity in the database; allowing any user to use the primary device to operate in a mode that provide accessibility to its full operations upon the user provided user name and access code matching with the preset user name and preset access code paired with the first mobile identity; allowing a single user to use the secondary device to operate a mode that provide accessibility to partial of its operation upon the user provided user name and access code matching with the preset user name and preset access code paired with the second mobile identity; wherein the full mode permits the user to clock-in and/or clock-out for attendance recording, view the recorded attendance, export the recorded attendance of any user and/or any combination derived thereof for the tied account; and wherein the partial mode only permits the user to view recorded attendance, export the recorded attendance of the particular user account and/or any combination derived thereof for the tied account.

The method as described in the present invention is implementable by a software application and/or program particularly suited for operation with hand-held devices such as smartphones, Personal Digital Assistants (PDA), mobile computers and/or other multifunctional electronic hand-held devices with compatible operating systems to support the application. Preferably, the hand-held device comprises a display screen, data entry inputs via touch screen, keyboards and/or voice commands, operating system to support the application and most preferably, it has a camera to recognize face features of the user. The hand-held device communicates with the server through the application installed onto the hand-held device. The hand-held device is preferred to be a personal hand-held device to the user so as to avoid "buddy punching."

"Buddy punching" generally refers to an act where employees at work clocking-in and/or punching-in attendances for their co-workers, especially when they are late for work. The present invention helps to eliminate this situation because the hand-held device having a function to clock-in and/or clock-out for attendance recording is registered under and personalized to a specific user.

Accordingly, the database stores the plurality of registered primary and secondary mobile identity, preset user names and preset access code linked to each user name, wherein each user name is tied to an account. Each account can be logged in with a user name and the linked access code. Each account stores all attendance recordings for a particular registered user and may have further information of the registered user such as full name, gender, address, contact number, designation and/or other user particulars.

According to a preferred embodiment of the present invention, each hand-held device bears a mobile identity, which is assigned by its manufacturer. The mobile identity is commonly known as International Mobile Equipment Identity (IMEI), which is stored in the hand-held device. The IMEI is used to differentiate the hand-held device as the primary and/or secondary device. For the primary and secondary device, owner of the hand-held device is preferred to initially log into his and/or her account after installation of the application as described. This initial log in step is essential as the action triggers the matching of the provided user name and access code to pair up with the preset user name and preset access code in the database. Upon this log in step, the primary and/or secondary device is then fully and/or partially operable.

In another embodiment of the present invention, the user name and access code can be in alphabetical, numerical and/or alphanumerical. The access code can be provided by the user and/or generated by biometric data such as facial features, fingerprints, palm prints and/or voice. For facial features, a camera is preferred to be used to capture an image containing facial features of the user. Facial templates are generated on the captured image and liveliness verification is performed. The captured image is used to match with a preset facial template stored in the database and verified if the user's face is live. Other methods may be used for liveliness verification of facial features, for example, three dimensional face recognition and/or blink recognition. It is also acceptable that only biometric data is provided to the application upon logging in.

In yet another embodiment of the present invention, there will always be a situation when not every employees and/or person who desires to keep track of attendances own a hand-held device and/or a hand-held device that has an operating system compatible with the application. In such an event, the hand-held devices of employees in managerial levels such as managers, supervisors are preferred to be used to permit those employees not owning the required hand-held device to clock-in and/or clock-out their attendances. The hand-held devices owned by managers and/or supervisors are preferred to be known as managerial devices and/or the primary devices. Each mobile identity of the primary device is stored in the database of the server and referred as the first mobile identity. The primary device may operate in the partial mode allows any user to clock-in and/or clock-out for attendance recording. That is to say, upon recognizing that the hand-held device is the primary device by matching the mobile identity of the hand-held device with the registered primary mobile identity stored in the database, any user, one at a time, is allowed to log into his and/or her account and clock-in and/or clock-out for attendance recording. Each user is preferred to log out of their accounts after accomplishing one and/or more desired tasks to allow another user to log into his and/or her account.

In still another embodiment of the present invention, the secondary device is operable only in partial mode. The partial mode only permits single user, which is preferably the owner of the hand-held device, to clock-in and/or clock-out for attendance recording, view the recorded attendance, export the recorded attendance and/or any combination thereof.

In another embodiment of the present invention, the hand-held device is set as a non-registered device when the provided mobile identity, which is sent silently to the server, failed to match with any registered mobile identity. If the user provides a registered user name and access code, the hand-held device is permitted to view and/or export the recorded attendance. However, if the user provided user name and access code fail to match with any preset user name and access code, the application prevents the user to log into the application. In order to log into the application, the user must register with the administrator.

In a further embodiment of the present invention, the server is preferred to be capable of delivering complex computing and storage capacity to one and/or more of the application. The server stores the plurality of registered primary and secondary mobile identities as well as the preset user identities and linked preset access codes. With matched user name, access code and mobile identity, the users are capable of accessing to the program through their hand-held devices to clock-in and/or clock-out, view the recorded attendance and/or export the recorded attendance and the recorded attendances are sent and stored in the server in communication with the application. Comparing with conventional time attendance recording using punch card, the system and method as described herein can improve manageability, require less maintenance and enable human resources to be more rapidly adjusted to meet fluctuating and unpredictable business demand.

In a further embodiment of the present invention, the hand-held device further comprises a Global Positioning System (GPS). The GPS is preferred to be used because it is capable of detecting locations of each user at each clock-in and/or clock-out occasion and the detected location is preferred to be tagged with the related clock-in and/or clock-out occasion. As a result, time and location of the user can be recorded during attendance recording. The location can be presented in geodetic location information, civic address information and/or a combination thereof.

In a particular embodiment of the present invention, the recorded attendances can be viewed and exported for printing. The recorded attendances are preferred to be stored in the server and exported into a sheet format for printing. The attendance sheets may be presented by having user information along with start and end dates of working days and clock-in and/or clock-out time with respect to specific locations detected by the GPS. The recorded attendances may be exported to the attendance sheet format that are sorted according to days, weeks, months and/or a selected date range.

The hand-held device can be connected to the server via a communication network. Preferably, the communication network is a wireless network connection established via a wireless protocol cloud, which is a GPRS cloud. However, it is obvious to a person skilled in the art that to substitute the technology with other wireless protocols and standards such as Code Division Multiple Access (CDMA) and its derivatives, Enhanced Data Rates for GSM Evolution (EDGE), 3G protocol, High Speed Packet Access (HSPA), 3GPP Long Term Evolution (LTE) and the like, in accordance to the advancement of wireless technology with time. Alternatively, the NTU is connected to a network switch. The network switch allows the network to be either connected to the servers, to an internet cloud and/or both.

In another further embodiment of the invention, the time attendance tracking system comprises a server, database, and at least one mobile device. Preferably, the server is in communication with a database storing a plurality of registered mobile identities and user accounts, in which the mobile identities are categorised into primary and secondary mobile identity, each mobile identity is tied to at least one user account. The at least one registered mobile device is in communication with the server, having a mobile identity and an application. The application is configured to provide a selection of first and second operation modes for a user to select one of the modes upon the activation of the application. The user is prompt to key-in their ID name and password to log-in the application, each mode will grant and the level of accessibilities will depends on the mobile phone identify and the level of the user account.

In the event of the mobile device having a primary mobile identity and the logged-in user account is an account tied to the primary mobile identity, the first mode of the application permits the logged-in user to perform attendance recording for any user account, and the second mode of the application permits the logged-in user to accept, reject, and/or modify a request sent by another user account and/or to transmit a request and/or modified request to the another user account.

In the event of the mobile device having a primary mobile identity and the logged-in user account is not an account tied to the primary mobile identity, the first mode of the application only permits the logged-in user to perform attendance recording for that particular account, and the second mode of the application permits the logged-in user to send a request to the at least one account tied to the primary mobile identity and/or accept a modified request.

In the event of the mobile device having a secondary mobile identity, the application only allows the account tied to this secondary mobile identity to access the operations of the application, the first mode of the application only permits the logged-in user to perform attendance recording for the particular account, and the second mode of the application permits the logged-in user to send a request to the at least one account tied to the primary mobile identity and/or accept a modified request.

In this embodiment of the invention, the request can be a leave application, overtime application, outstation application, meeting request, and/or any combination thereof. In this operation, the application of the mobile device prompts the user to choose a request from a list, and then based on the selected request, it provides a messaging interface with action buttons that suits the request so that the user to submit their application with supports and reasoning. The person who receives the request shall be notified by the server via email, SMS, instant message, and/or any combination thereof. The application may further provide the user with option buttons to accept, reject, and/or modify the request.

In this embodiment of the invention, the application may further provide a third operation mode, whereby in the event of the mobile device having a primary mobile identity and the logged-in user account is an account tied to the primary mobile identity, the third mode permits the logged-in user to view and/or to export the recorded attendance of any user account. In the event of the mobile device having a primary mobile identity and the logged-in user account is not an account tied to the primary mobile identity, the third mode only permits the logged-in user to view and/or export the recorded attendance of that particular account. In the event of the mobile device having a secondary mobile identity, the third mode only permits the logged-in user to view and/or to export the recorded attendance of that particular account.

In this embodiment of the invention, the application may further provide a fourth operation mode that permits the logged-in user to edit and update the account information to the server.

In use, the method and system of tracking time attendance are described hereinafter:

Referring to FIG. 1, an activation process of the program starts (101) when the user selects for first time activation (103). Upon selecting for first time activation (103), the user is prompted to key in a network number in either an Internet Protocol (IP) Address page (105) and/or a domain name system (DNS) page (107). In the IP address page (105), the user is prompted to provide a static IP address and its relevant connection port, whereas in the DNS page (107), the user is prompted to provide a DNS IP and its relevant port. Both the IP and DNS IP addresses are preferred to be provided by the administrator associated with the server. In an event that the hand-held device is directly connected to the server via a local area network (LAN), the user is required to select the IP address page (105) for the activation process. If the IP and DNS IP addresses are invalid, the program rejects the connection and prompts the user to re-enter the IP and/or DNS IP address. If the IP and/or DNS IP address is valid, the program checks for connectivity of the program to the server and upon successful connectivity, a log in page (109) is shown on the screen of the hand-held device. The user is prompted to provide his and/or her user name and access code in the log in page (109). If connection to the server is available, the user name, access code and the mobile identity is matched with the database in the server in an online mode. It is to be noted that the mobile identity is sent silently from the hand-held device to the server when the user provides his and/or her user name and access code. User type (111) is then identified from the matching process. If connection is not available, an offline mode appears on the screen of the hand-held device (113).

Still referring to FIG. 1, upon entering the log in page (109), when no connection is detected between the server and the hand-held device and/or when the server is down, the time attendance can be recorded as well. That is to say, workers in business trips can record their time attendance even when they are in areas without internet connection. The hand-held device is preferred to be in communication with a local database provided within the hand-held device. In the offline mode (113), the user is capable of performing tasks like clock-in and/or clock-out for attendance recording (115), check for location (119) and/or seek for further assistance in a "Help" page (121). To clock-in and/or clock-out in the offline mode (113), the single user is required to log into the program to clock-in and/or clock-out time attendance at least once before leaving for places without internet connections in order to create a tag for the server to pair the program installed in the hand-held device. That is to say, upon logging in to the program in the online mode, the user's user name and access code are saved in the local database. The single user herein refers to the owner of the hand-held device. During unavailability of connection between the program and the server, user name and access code entered in the log in page (109) are preferred to be checked with the saved user name and access code in the database. Upon matching of the entered user name and access code with the saved user name and access code, the user can be identified and allowed to proceed to attendance recording (115). Following to that, any clock-in and/or clock-out attendance in the offline mode will be saved in the local database. Whenever internet connection is available, all recorded clock-in and/or clock-out attendances are uploaded to the database in the server. Upon successful attendance recording, a message is shown on the screen of the hand-held device to notify the user (117).

Still referring to FIG. 1, different user type can be distinguished in the online mode (111). The different types of accounts stored in the database are "user" (123), "visitor" (127) and "administrator" (125). In the user account (123), the user can either register his and/or her biometric data for first time log in and/or proceed for a clock-in and/or clock-out page.

Figure 2:
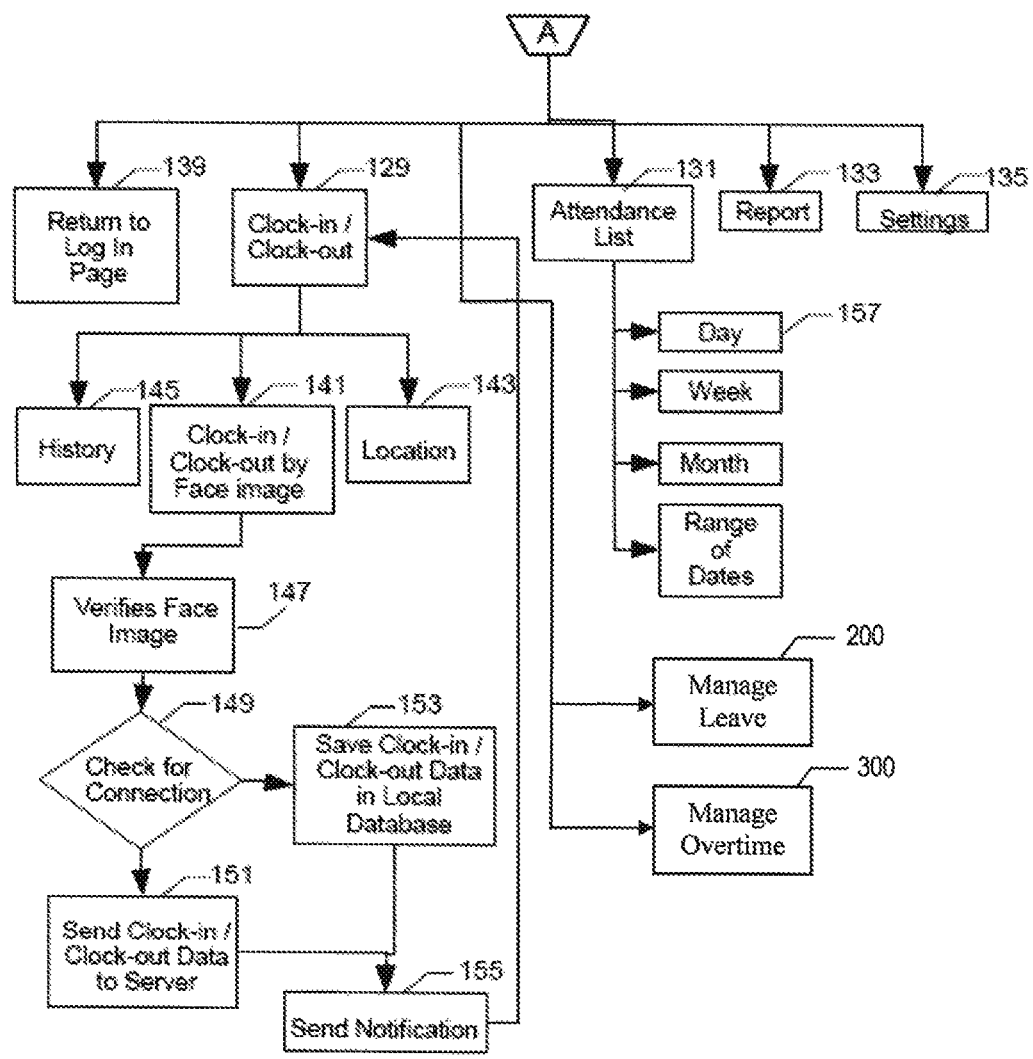
FIG. 2 shows a process flow depicting the steps taken in another preferred embodiment of the present invention.

Now referring to FIG. 2, the program prompts the user (123) to select a desired task from a plurality of tasks including clock-in and/or clock-out for attendance recording (129), view recorded time attendance (131), export recorded attendance for printing (133), edit settings (135) and/or return to the log in page (139). For the clock-in and/or clock-out task (129), the user is allowed to clock-in and/or clock-out (141), view history of time attendances (145) and view current location in a map (143). To clock-in, the user may clock-in and/or clock-out attendance by providing his and/or her face biometric data such as face features. The biometric data is then verified (147) by comparing it with the preset biometric data stored either in local database and/or the database of the server. Upon clocking-in and/or clocking-out attendance, the program preferably checks for connection between the program and the server (149). If connection is available, the clock-in and/or clock-out time and location and/or together with the verified biometric data is sent to the server for recording (151). If no connection can be detected, the clock-in and/or clock-out time and location and/or together with the verified biometric data are preferred to be saved in the local database (153) and further uploaded to the server when connection is available. Upon successful delivery of the clock-in and/or clock-out time and location and/or together with the verified biometric data to the server and/or the local database for the respective online mode and/or offline mode, a notification is sent to the hand-held device (155) to notify the user that the clock-in and/or clock-out time is successfully recorded.

Figure 5:
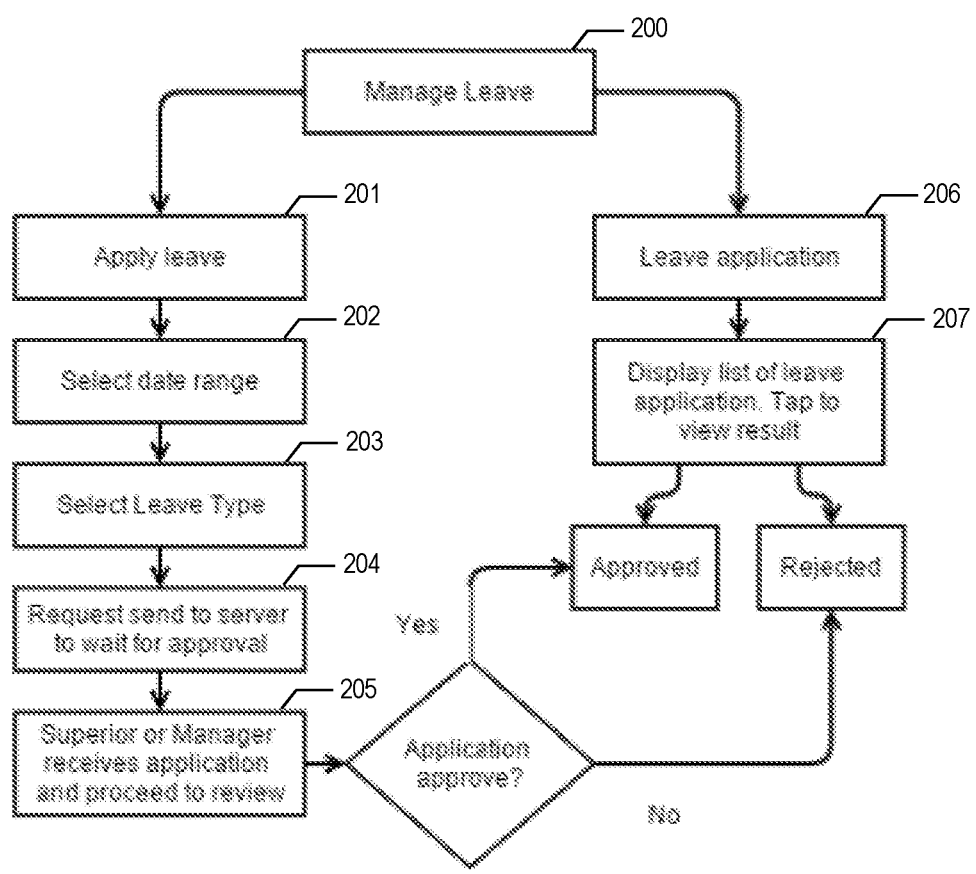
FIG. 5 shows a process flow of a leave management system for a user.
Figure 6:
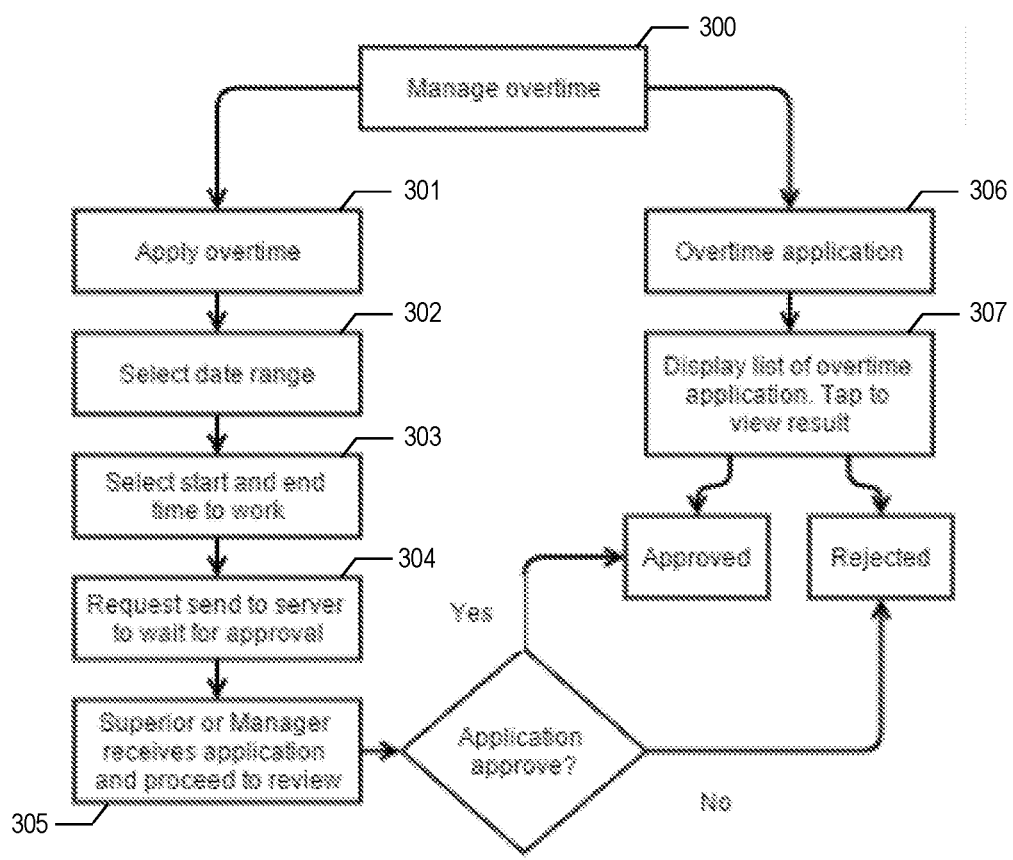
FIG. 6 shows a process flow of an overtime management system for a user.

The program may also provide manage leave (200) and manage overtime (300) selections for the user to apply for leave and overtime schedule. The process flow of manage leave is shown in FIG. 5. In step 201, the user may select the apply leave option to initiate the application. In step 202, upon selecting the leave option, the user is prompted to select a date range. In step 203, the user is prompted to select a leave type. In step 204, the leave request is generated and further sent to the server for approval. In step 205, the manager or superior is notified by the server and proceed to review the request. In steps 206 and 207, the user may also select the leave application option to display the list of leave request created. The user can tap to view the result of each request. The process flow of manage overtime is shown in FIG. 6. In step 301, the user may select the apply overtime option to initiate the application. In step 302, upon selecting the overtime option, the user is prompted to select a date range. In step 303, the user is prompted to select start and end time of the overtime. In step 304, the overtime request is generated and further sent to the server for approval. In step 305, the manager or superior is notified by the server and proceed to review the request. In steps 306 and 307, the user may also select the overtime application option to display the list of overtime request created. The user can tap to view the result of each request.

Accordingly, upon successful log in to the first mode, the program checks for availability of saved attendance in the local database. Any saved attendance in the local database is preferred to be uploaded to the server before permitting the user to proceed for attendance recording.

Still referring to FIG. 2, to view recorded attendances (131), the user may select to view all recorded attendances and/or sort the attendances according to a list of time period including day, week, month and/or a range of date (157). The recorded attendances can be exported to a printable format to be printed out subsequently (133). As for the task to edit settings (135), the user is allowed to switch to different servers, change time and date format, search for date, contact server for providing feedback, sound adjustment and/or view details of the software application such as application name, application version, device model and its operating system.

Figure 3:
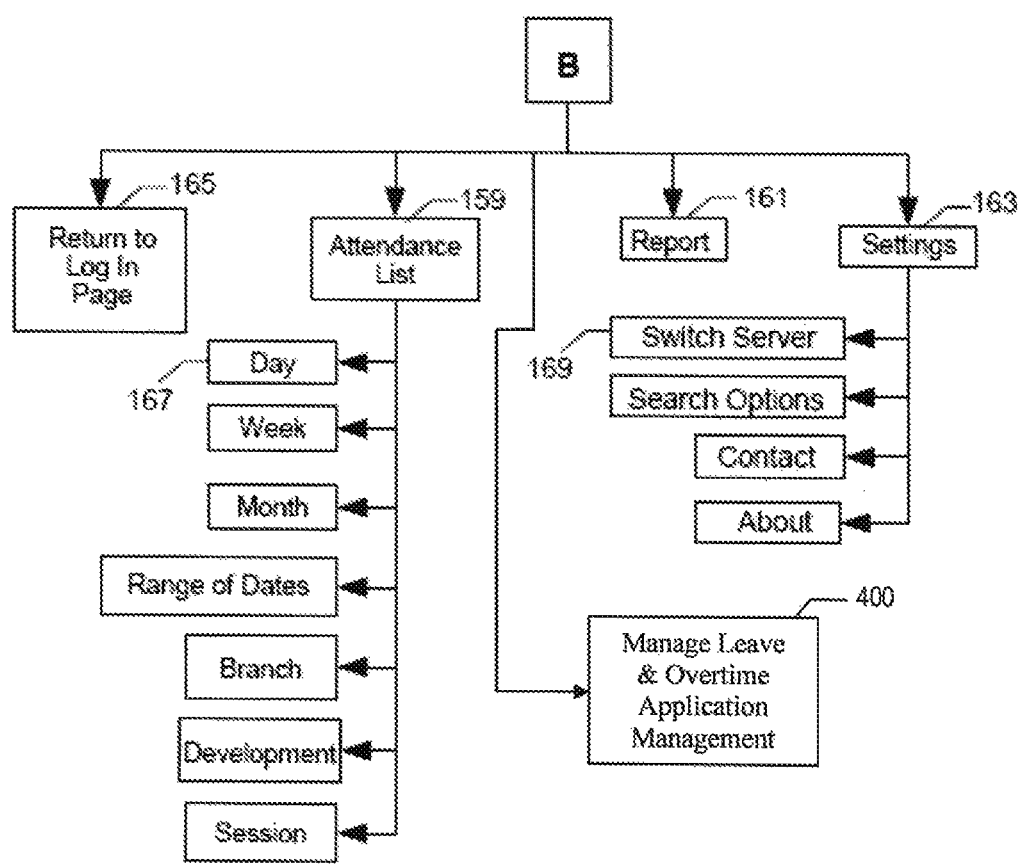
FIG. 3 shows a process flow depicting the steps taken in an embodiment of the present invention.

Now referring to FIG. 3, the administrator is capable of selecting from a plurality of tasks including view accorded attendance (159), export recorded attendances for printing (161), edit settings of the program (163) and/or return to the log in page (165). The "administrator" is preferred to have the highest authority compared to the "user" and "visitor" and permitted to view recorded attendances of all registered users. To view recorded attendances of any user (159), the administrator may provide the user name of a desired user. Then, the administrator may check all recorded attendances and/or sort the recorded attendances according to a list of time period including day, week, month and/or a range of date (167). The recorded attendances can be exported to a printable format to be printed out subsequently (161). The administrator is allowed to edit settings of the program including switch to different servers, check for user name, contact server for providing feedback and/or view details of the program such as application name, application version, device model and its operating system. However, the administrator is restricted from clocking-in and/or clocking-out attendance.

Figure 7:
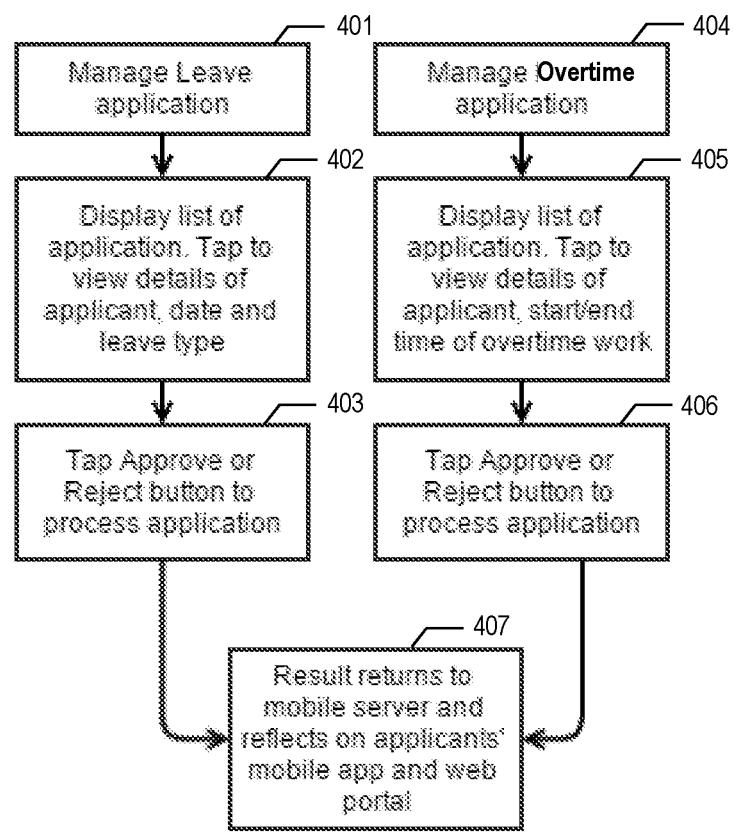
FIG. 7 shows a process flow of a leave and overtime application management system for an administrator.

The program may also provide manage leave and overtime application management (400) selections for the administrator to manage the user's leave and overtime requests. The process flow of manage leave is shown in FIG. 7. Preferably, manage leave application (401) option and manage overtime application (404) option is provided by the program. In step 402, upon the manage leave application is being selected, the program displays a list of the leave application. The administrator may tap to view the details such as the applicant, date, and leave type. In step 403, approve and reject buttons are provided for the administrator to select. In step 405, in the event of the manage overtime application is being selected, the program displays a list of the overtime application. The administrator may tap to view the details such as the applicant and start/end time of overtime work. In step 406, approve and reject buttons are provided for the administrator to select. In step 407, the result is returned to the server and the server further notifies the applicant.

Figure 4:
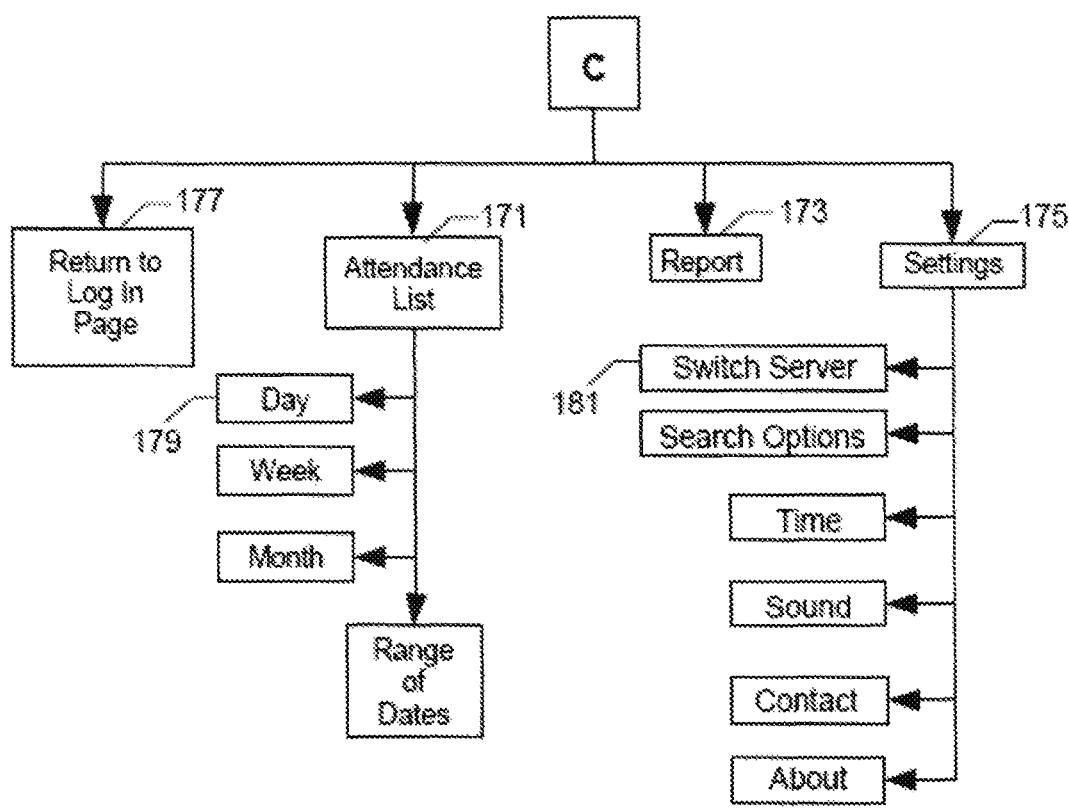
FIG. 4 shows a process flow depicting the steps taken in another embodiment of the present invention.

Referring to FIG. 4, the visitor are capable of using the hand-held devices to perform tasks such as view recorded attendances (171), export recorded attendances for printing (173), edit settings of the program (175) and/or return to the log in page (177). The recorded attendances can be sorted according to a desired time period such as day, week, month and/or a range of dates (179). The visitor may also edit settings of the program including switch to different servers, change time and date format, search for date, contact server for providing feedback, sound adjustment and/or view details of the program such as application name, application version, device model and its operating system (181).

The present disclosure includes as contained in the appended claims, as well as that of the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention.

What is claimed is:

1. A time attendance tracking system, comprising:
a first registered mobile communication device;
a second registered mobile communication device;
a server in communication with a database storing a plurality of registered international mobile equipment identities and user accounts, the mobile identities being categorized into primary and secondary international mobile equipment identities, each international mobile equipment identity being tied to at least one user account;

the first and second registered mobile communication devices in communication with the server, each of the first and second registered mobile communication devices comprising:
- a verification system to verify the user and a corresponding registered mobile communication device; and
- first and second operation modules having different accessibilities of operations depending on a logged-in user account and the corresponding registered mobile communication device, the first registered mobile communication device having a primary international mobile equipment identity and its first operation module permits the logged-in user to perform attendance recording for any user account and its second operation module permits the logged-in user to accept, reject or modify a request sent by another user account or to transmit a request or modified request to a corresponding user account when the logged-in user account is an account tied to the primary international mobile equipment identity, the second registered mobile communication device having a secondary international mobile equipment identity and its first operation module is restricted to only permitting the logged-in user to perform attendance recording for the user account corresponding to the primary international mobile equipment identity of the second registered mobile communication device and its second operation module permits the logged-in user to send a request to the account that is tied to the primary international mobile equipment identity or accept a modified request when the logged-in user account is an account tied to the secondary international mobile equipment identity, and the request includes content consisting of the combination of a leave request, an overtime request, an outstation request, a meeting request and combinations thereof.

2. The system according to claim 1, wherein the verification system includes reading information relating to the international mobile equipment identities of the first and second registered mobile communication devices, receiving information relating to user identity and password, and communicating with the server to run a matching procedure on collected information with those in the database.

3. The system according to claim 1, wherein the first and second registered mobile communication devices further comprise a third operation module;
the third operation module of the first registered mobile communication device having the primary international mobile equipment identity permitting the logged-in user to view or export the recorded attendance of any user account when the logged-in user account is an account tied to the primary international mobile equipment identity; and
the third operation module of the second registered mobile communication device having the secondary international mobile equipment identity is restricted to only permitting the logged-in user to view or export the recorded attendance for the user account corresponding to the secondary international mobile equipment identity of the second registered mobile communication device when the logged-in user account is an account tied to the secondary international mobile equipment identity.

4. The system according to claim 1, wherein the first and second registered mobile communication devices further comprise a fourth operation module that permits the logged-in user to edit and update account information to the server.

5. The system according to claim 1, wherein the first and second registered mobile communication devices further comprise an authentication system for the authentication of the user.

6. The system according to claim 5, wherein the authentication system is selected from the group consisting of fingerprint recognition, voice recognition, face recognition, hand geometric recognition, iris recognition, motion detection and combinations thereof.

7. The system according to claim 1, wherein the first and second registered mobile communication devices further comprises a global positioning system permitting the acquisition and recordal of the location of the first and second registered mobile communication devices during the recording of the attendance.

8. The system according to claim 1, wherein the transmission of the request generated by the second operation module triggers the server to send a notification to the registered mobile communication device that the user account is tied to.

9. The system according to claim 1, wherein the first and second registered mobile communication devices are selected form the group consisting of a personal digital assistant, a smart phone, a laptop, a netbook, a phablet, a phoblet and combinations thereof.

* * * * *